(12) United States Patent
Cregan

(10) Patent No.: US 8,834,221 B2
(45) Date of Patent: Sep. 16, 2014

(54) FLEXIBLE RESTRAINT

(75) Inventor: Brian Leslie Cregan, Sussex Inlet (AU)

(73) Assignee: Ocean and Earth Productions Pty Limited (AU)

( * ) Notice: Subject to any disclaimer, the term of this patent is extended or adjusted under 35 U.S.C. 154(b) by 0 days.

(21) Appl. No.: 13/514,164

(22) PCT Filed: Dec. 2, 2010

(86) PCT No.: PCT/AU2010/001625
§ 371 (c)(1),
(2), (4) Date: Jun. 6, 2012

(87) PCT Pub. No.: WO2011/069186
PCT Pub. Date: Jun. 16, 2011

(65) Prior Publication Data
US 2012/0244763 A1    Sep. 27, 2012

(30) Foreign Application Priority Data

Dec. 7, 2009   (AU) .............................. 2009905957

(51) Int. Cl.
*B63B 1/00*    (2006.01)
*A01K 27/00*   (2006.01)
*B63B 35/79*   (2006.01)

(52) U.S. Cl.
CPC ........... *A01K 27/003* (2013.01); *B63B 35/7936* (2013.01); *A01K 27/005* (2013.01)
USPC .......................................................... 441/75

(58) Field of Classification Search
USPC ............................................................ 441/75
See application file for complete search history.

(56) References Cited

U.S. PATENT DOCUMENTS

| | | | |
|---|---|---|---|
| 1,924,596 A | | 8/1933 | Davis |
| 5,146,876 A | * | 9/1992 | McPhail ....................... 119/798 |
| 5,194,026 A | * | 3/1993 | Corwin et al. .................. 441/75 |
| 5,738,556 A | * | 4/1998 | Palmieri ......................... 441/75 |
| 5,762,108 A | * | 6/1998 | Hunter ......................... 138/109 |
| 5,873,328 A | * | 2/1999 | Campbell .................... 119/798 |
| 6,000,979 A | * | 12/1999 | Stewart .......................... 441/75 |
| D462,406 S | * | 9/2002 | Kessler ........................ D21/769 |
| 6,471,560 B2 | * | 10/2002 | Kerckhoff ...................... 441/75 |
| 7,204,734 B2 | | 4/2007 | Kawasaki |
| 7,708,612 B2 | * | 5/2010 | Wardle ............................ 441/75 |
| 8,322,311 B2 | * | 12/2012 | Gould et al. .................. 119/798 |
| 2012/0244763 A1 | * | 9/2012 | Cregan ............................ 441/75 |

FOREIGN PATENT DOCUMENTS

EP    2112415 A1 * 10/2009 ............. F16L 25/00

* cited by examiner

*Primary Examiner* — Lars A Olson
*Assistant Examiner* — Jovon Hayes
(74) *Attorney, Agent, or Firm* — Morriss O'Bryant Compagni

(57) ABSTRACT

A flexible restraint (1) for use as a leash for a surfboard, the restraint including an elongate molded cord (2) that includes an end housing (3) which encapsulates an end (4) of a connector provided in the form of a swivel assembly (5). The end housing (3) is formed around the end (4) of the swivel assembly (5) to secure the cord (2) to the swivel assembly (5), the end housing (3) being integrally molded with the cord (2) so as to provide a unitary structure.

15 Claims, 2 Drawing Sheets

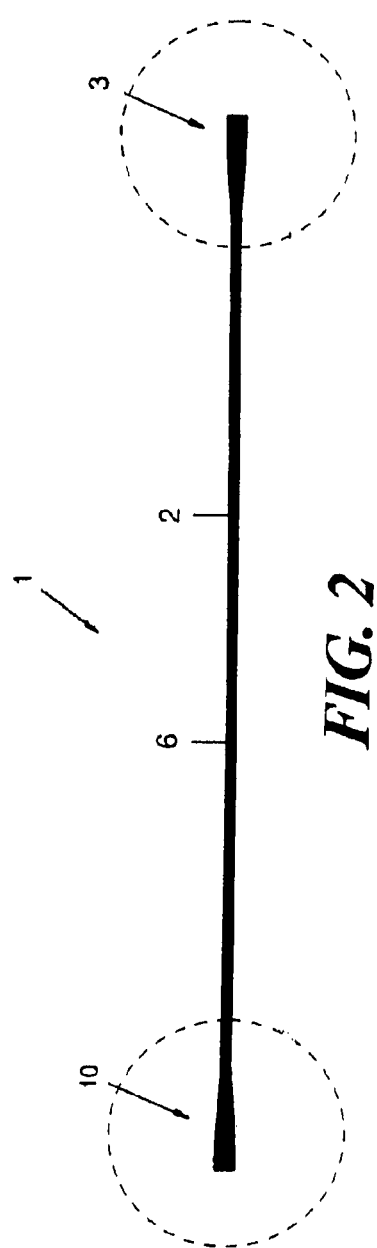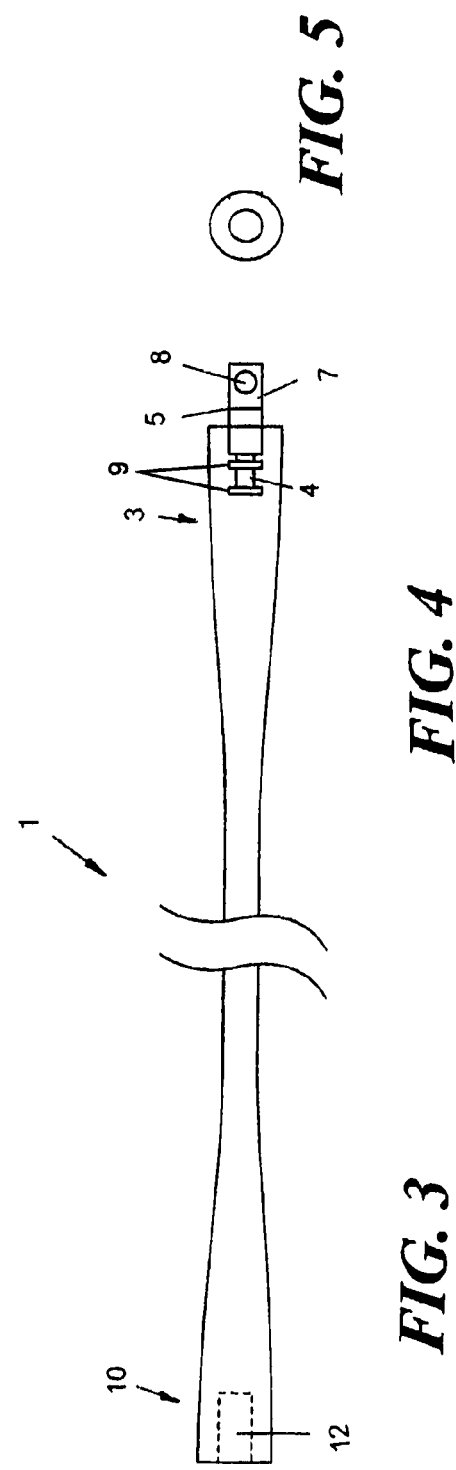

FLEXIBLE RESTRAINT

FIELD OF THE INVENTION

The invention generally relates to a flexible restraint or leash such as for restraining a surfboard relative to a rider. The term surfboard includes within its scope all types of surfboards including body boards and stand up paddle boards for example. The restraint may find use with other sporting or leisure equipment such as snowboards. The restraint may find use in other applications such as a tether, animal leash or the like.

BACKGROUND OF THE INVENTION

Surfboard leashes are generally used to attach a surfboard to a surfer. Typically a leash has a first end connected to the board and the opposing end connected to the surfer. As such, when the surfer is separated from the board the leash restrains the board from movement so the surfer can easily regather the board.

Typically, leashes are made from thin generally round flexible material so as to not restrict the movement of the surfer nor cause drag when paddling or wave riding. Additionally, the leash may be stretchable when the surfboard is swept away, by a wave, thereby not jolting the surfer when the leash becomes extended. Furthermore, as the surf zone can be dangerous to both the surfer and swimmers, it is important that the leash does not easily break.

It is known to produce surfboard leashes by attaching end structures to either end of a flexible main line. These end structures are typically separately moulded to house an end of a swivel such that the opposing end of the swivel is free to rotate relative to a strap assembly, such as an ankle strap, a rail saver or similar attachment strap for the board.

In this configuration, the flexible main line and the individual end structures are joined in a two step process, first the flexible main line is produced and then the end structures are over-moulded, or similarly attached, onto each end of the flexible main line. As such, the joining of the flexible main line with the end structures results in a two piece structure at each end.

A disadvantage of this two piece structure is that a weak point can form in the vicinity of the joint, which can weaken the leash causing the leash to break. A further disadvantage of the two piece structure is that the manufacturing cannot be performed in a one step process.

SUMMARY OF THE INVENTION

In accordance with one aspect there is provided a flexible restraint suitable for use as a leash for a surfboard, the restraint including a cord that includes an elongated elastic main line portion and an end portion which at least in part encapsulates a connector, the end portion and main line portion being integrally moulded as a one piece structure.

In one embodiment the end portion may taper outwardly from the main line portion so that the end portion is of cross-section sufficient to accommodate the connector whilst the main line portion has a relatively smaller cross-section. Preferably the connector includes a flange configured to engage with the end portion of the cord.

In one embodiment the connector may be in the form of a swivel assembly; and wherein the end portion restrains movement of an end of the swivel assembly and an opposing end of the swivel assembly is free to revolve. In one embodiment an attachment strap is provided which is connected to the opposing end of the swivel assembly for use in securing the flexible restraint to a user such that the flexible restraint is rotatable relative to the user.

In one embodiment the cord may further include a second end portion, at an opposing end of the main line portion relative to the first mentioned end portion, which at least in part encapsulates an end of a second connector. An attachment band may be provided which is connected to the opposing end portion of the cord via the second swivel assembly such that the attachment band is rotatable relative to the cord. The attachment band may for example include an attachment tie for use in connecting the opposing end of the cord to a surfboard.

In one embodiment the main line and the or each end portion is formed from urethane plastics material. The main line portion and the or each end portion may be formed in a moulding apparatus in a one step process.

In accordance with another aspect there is provided a method for producing a flexible restraint, as claimed in any preceding claim, including the step of moulding the main line portion and at least one end portion as a one piece structure in one step.

In one embodiment the method may include the further step of locating a connector within said mould and thereafter moulding the main line and at least one end portion as a one piece structure so that the end portion encapsulates the connector.

In one embodiment there is provided the further step of moulding the main line and a second end portion, at an opposing end of the main line relative to the end portion, as a one piece structure.

In one embodiment the method may include the further step of locating a second connector within said mould and thereafter moulding the main line and said end portions as a one piece structure so that end portions encapsulate the respective connectors.

Preferably the main line and the end portions are formed from urethane plastics so as to be flexible and substantially elastic.

BRIEF DESCRIPTION OF THE DRAWINGS

Preferred embodiments of the invention will hereinafter be described, with reference to the accompanying drawings, in which;

FIG. 2 is a side elevation of a flexible cord which forms part of the flexible restraint shown in FIG. 1;

FIG. 3 is a detail of one end of the card shown in FIG. 2;

FIG. 4 is a detail of the other end of the cord shown in FIG. 2;

FIG. 5 is an end view of the end of the cord shown in FIG. 4;

DETAILED DESCRIPTION OF THE INVENTION

Figure 1:
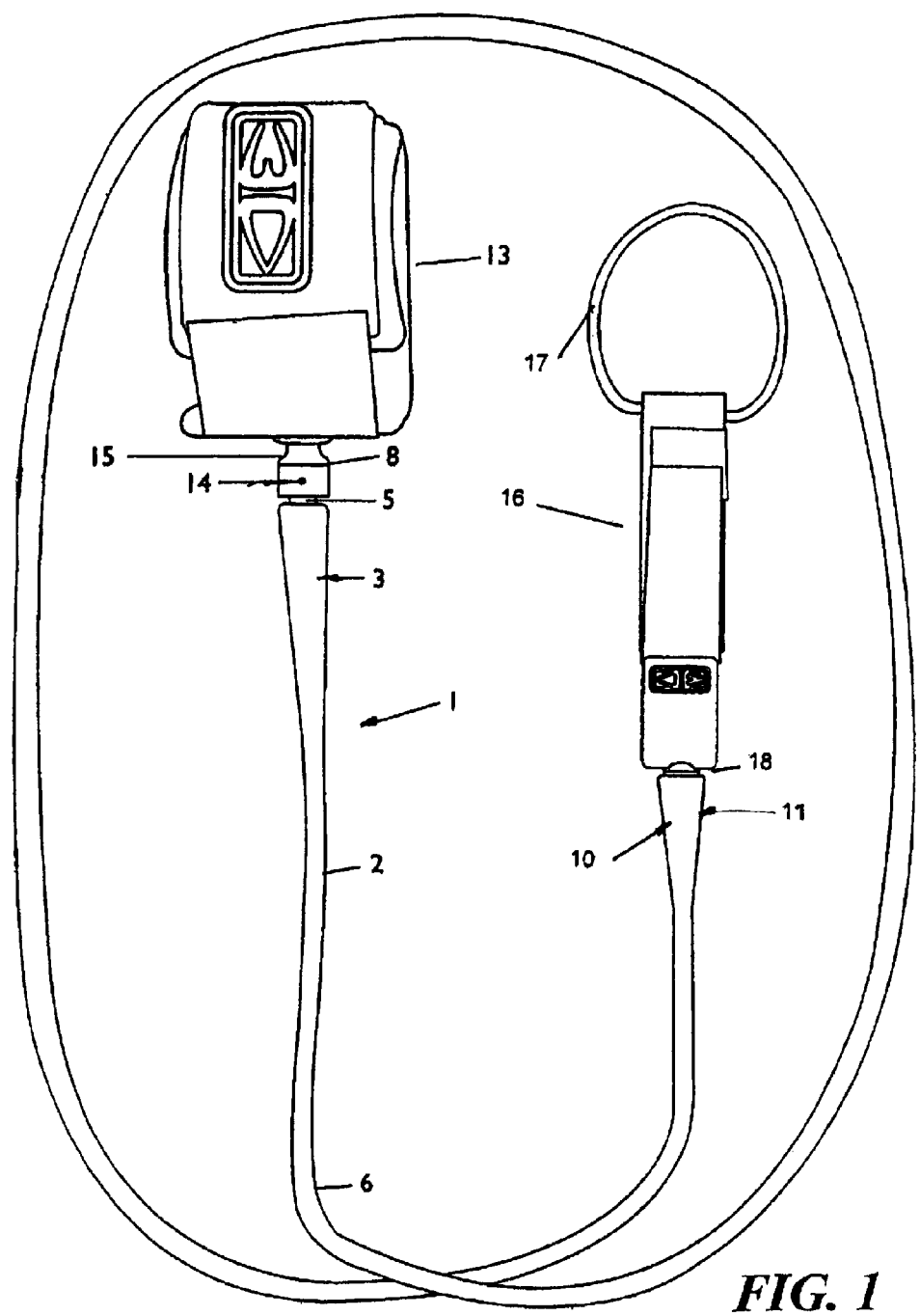
FIG. 1 is an illustration of a flexible restraint in accordance with a preferred form of the invention.

FIG. 1 illustrates a flexible restraint 1 for use as a leash for a surfboard (not shown), the restraint 1 including an elongate unitary moulded cord 2 that includes a main line portion 6 and end portions 3 and 10 which provide an end housing which encapsulates an end 4 of a connector which is provided in the form of a swivel assembly 5 and a second end housing which encapsulates a second connector end 12.

In this configuration, the end portion 3 is formed around the end 4 of the swivel assembly 5 so as to secure the cord 2 to the swivel assembly 5. As such, the end portion 3 is integrally moulded with the main line portion 6 of the cord 2 so as to provide a unitary or one piece structure. Accordingly, the end housing 3 restrains movement of the end 4 of the swivel assembly 5 and the opposing end 7 of the swivel assembly 5 is free to revolve. The opposing end 7 of the swivel assembly 5 includes a small circular bore 8.

The end 4 of the swivel assembly 5 includes flanges 9 which engage with the end portion 3. It may be appreciated that in this configuration the end portion 3 is moulded so as fill to gaps that form between the flanges 9 so as to secure the swivel assembly 5 to the end housing 3.

The cord 2 tapers outwardly from the main line portion 6 toward the end portion 3 so that the end portion 3 is of cross-section sufficient to accommodate the end 4 of swivel assembly 5 whilst the main line portion 6 has a relatively smaller cross-section.

The diameter of the main line portion 6 of the cord is preferably 7 mm and tapers outwardly the end portion 3 which has a maximum diameter of preferably 15 mm. In this configuration, the main line portion 6 is flexible, that is, bendable and elastically stretchable and light weight so as to not restrict the movement of the surfer. Furthermore, the relative thinness of the main line portion 6 provides a low hydrodynamic drag during paddling or wave riding, whilst the end portion 3 is of sufficient thickness to thereby proving structural strength to secure the end 4 of the swivel assembly 3.

Additionally, the tapering between the diameter of the main line portion 6 and the end portion 3 is of a low taper angle so as to be low drag and not present a surface which could easily catch on, for example, the side of the surf board.

The second end portion 10, at an opposing end 11 of the cord 2 relative to the end portion 3, which encapsulates an end 12 of a second swivel assembly (not shown). The second end portion 10 is similarly configured to the end portion 3 tapering outwardly from the main line portion 6 of the cord 2 toward the opposing end 11 of the cord 2 so as to provide the second end portion 10 with a cross-section sufficient to accommodate the end 12 of second swivel (not shown).

An attachment strap assembly 13 is connected to the opposing end 7 of the swivel assembly 5 for use in securing the flexible restraint 1 to a user (not shown) such that the flexible restraint 1 is rotatable relative to the user. In this configuration, a pin 14 is inserted through the bore 8 to secure a moulded coupling 15 of the attachment strap 13 to the opposing end 7 of the swivel assembly 5.

The opposing end 11 of the cord 2 is connected via the second swivel assembly 18, which similarly configured to the swivel assembly 5, by an attachment band 16 (also known as a rail saver) to the surfboard (not shown). The attachment band 16 includes attachment tie 17 which engages with a plug that is generally provided at the rear of the surfboard (not shown). In this configuration, it may be appreciated that the attachment band 16 and the attachment tie 17 are rotatable relative to the cord. Furthermore, as the cord 2 has swivels on both ends and is thereby rotatable to reduce the likelihood of the cord 2 becoming tangled.

Referring now generally to FIGS. 2 to 5, the cord 2 is formed as single piece including the end portion 3 and second end portion 10 in a moulding apparatus (not shown). The cord 2 and hence the end portion 3 and second end portion 10 are formed from urethane plastic, the urethane plastic allowing the cord 2 to be flexible, that is, bendable and elastically stretchable. Furthermore, as the cord 2 is formed as single piece, the cord 2 and hence the end portion 3 and second end portion 10 are able to be formed in a one-step process. In this one-step process the end portion 3 and second end portion 10 encapsulate the end 4 of the swivel assembly 5 and the end 12 of the second swivel assembly 18 respectively.

In another aspect of the invention, there is disclosed a method for producing the flexible restraint 1, the method including moulding the 2 cord including the main line portion 6, the end portions 3 and 10 as a unitary one piece structure the end portions encapsulating at least in part respective swivel assemblies.

The moulding apparatus may be an injection moulding device and may include a mould having a cavity into which urethane plastics would be injected to form the cord 2. The mould cavity may be straight or wind around in the mould to reduce the size of the mould. Typically, the non-stretched length of a flexible restraint 1 is approximately 2 meters. Furthermore, when the flexible restraint 1 is stretchable, such as when the surf board is swept away from the surfer by a wave, the restraint 1 may stretch under this load from, for example, from 2 meters in length to 3 meters in length. As the restraint 1 is made from an elastic material, when load is released the restraint 1 returns substantially to the non-stretched length.

In the manufacturing process the end 4 of the first swivel 5 and the end 12 of the second swivel 18 are positioned within the mould such than when the urethane plastic is injected the plastic conforms to the mould and encapsulates the end 4 of the first swivel 5 and the end 12 of the second swivel 18.

As such it may be appreciated that the end portion 3 and the second end portion 10 are formed in a one step process, the end housing 3 encapsulating the end of the swivel assembly 5 and the second end housing 10 encapsulating the end 12 of the second swivel assembly 18 so as to form a unitary structure.

It is envisaged that this one piece structure will lessen the likelihood of the leash breaking as there are no joints between the cord and the end mountings, as present in known conventional leashes.

The use of the term surfboard herein is simply one example of an article that may be attached to the restraint. For example, other articles that may be attached to the restraint so as to provide a flexible tether include body boards, snow boards, stand up paddle boards, other sports equipment and animals.

Many modifications will be apparent to those skilled in the art without departing from the scope of the present invention.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

LIST OF PARTS

1. Flexible Restraint
2. Cord
3. End Housing
4. End of Swivel Assembly
5. Swivel Assembly
6. Main Portion
7. Opposing End of the swivel Assembly
8. Bore
9. Flanges
10. Second End Housing
11. Opposing End of Cord
12. End of Second Swivel Assembly
13. Attachment Strap
14. Pin
15. Moulded Coupling 16. Attachment Band
17. Attachment Tie
18. Second Swivel Assembly

The invention claimed is:

1. A flexible restraint suitable for use as a leash for a surfboard, the flexible restraint including a cord that comprises an elongated elastic main line portion and an end portion made of moldable elastic material which tapers outwardly from the main line portion so that the end portion is sized and of a cross-section sufficient to receive and accommodate the encapsulation of at least a part of a connector within the moldable elastic material of the end portion, the connector including a flange configured to engage with the moldable elastic material of the end portion of the cord when encapsulated therein, and the flange of the connector being structured with gaps about the flange that are filled with molding material when molded into the moldable elastic material of the end portion, and wherein the end portion, main line portion and connector are integrally molded as a one piece structure.

2. The flexible restraint of claim 1, wherein the connector is in the form of a swivel assembly; and wherein the end portion restrains movement of an end of the swivel assembly and an opposing end of the swivel assembly is free to revolve.

3. The flexible restraint of claim 2, including an attachment strap which is connected to the opposing end of the swivel assembly for use in securing the flexible restraint to a user such that the flexible restraint is rotatable relative to the user.

4. The flexible restraint of claim 3, wherein the cord further includes a second end portion, at an opposing end of the main line portion relative to the end portion, the second end portion being made of moldable elastic material and being sized and structured to receive and encapsulate at least a part of an end of a second connector within the moldable elastic material of the second end portion.

5. The flexible restraint of claim 4, further including an attachment band which is connected to the opposing second end portion of the cord via the second swivel assembly such that the attachment band is rotatable relative to the cord.

6. The flexible restraint of claim 5, wherein the attachment band includes an attachment tie for use in connecting the opposing end of the cord to a surfboard.

7. The flexible restraint of claim 1, wherein the main line and the end portion is formed from urethane plastics material.

8. The flexible restraint of claim 1, wherein the main line portion and the end portion is formed in a molding apparatus.

9. The flexible restraint of claim 8, wherein the main line portion and the end portion is formed to and encapsulates the connector in a one step process.

10. A method for producing a flexible restraint suitable for use as a leash for a surfboard, comprising:
providing a mold for forming a cord, the mold being structured with a cavity defining a main line and at least one end portion, and having a portion for receipt of a connector;
locating at least one connector in said portion of said mold for receipt of a connector, the connector being structured with at least one flange positioned to be encapsulated with elastic molding material;
injecting an elastic material into the cavity of the mold to form an integrally molded one piece main line portion and at least one end portion of a cord of a flexible restraint, the elastic material forming about a portion of the connector, including the at least one flange, to encapsulate the portion of the connector in and at the at least one end portion; and
removing the integrally molded one piece structure from the mold.

11. The method for producing a flexible restraint of according to claim 10, further including the step of molding the main line and a second end portion that is sized and structured to receive and encapsulate at least a part of a connector, at an opposing end of the main line relative to the end portion, as a one piece structure.

12. The method according to claim 11 including the step of locating a second connector within said mold and molding the main line and said end portions as a one piece structure so that end portions encapsulate the respective connectors.

13. The method for producing a flexible restraint according to claim 10, wherein the main line and the end portions are formed from urethane plastics so as to be flexible and substantially elastic.

14. A flexible restraint suitable for use as a leash for a surfboard, the restraint including a cord that comprises an elongated elastic main line portion and an end portion of moldable elastic material which is sized and structured to receive and encapsulate at least a part of a connector having a flange and gaps formed relative to the flange to engage the moldable elastic material of the end portion of the cord when encapsulated therein, the end portion, main line portion and connector being integrally molded as a one piece structure.

15. A flexible restraint as claimed in claim 1, wherein said connector is further configured with two spaced apart flanges which further provide said gaps therebetween, the gaps being filled with molding material when the flanges of the connector are encapsulated in the moldable elastic material of the end portion during molding.

* * * * *